(12) United States Patent
Higuchi

(10) Patent No.: US 8,538,246 B2
(45) Date of Patent: Sep. 17, 2013

(54) IMAGE DATA RECORDING APPARATUS, IMAGE DATA RECORDING METHOD, PROGRAM AND MEMORY MEDIUM

(75) Inventor: Hirokazu Higuchi, Fujisawa (JP)

(73) Assignee: Canon Denshi Kabushiki Kaisha (JP)

( * ) Notice: Subject to any disclaimer, the term of this patent is extended or adjusted under 35 U.S.C. 154(b) by 2026 days.

(21) Appl. No.: 11/135,068

(22) Filed: May 23, 2005

(65) Prior Publication Data

US 2005/0270585 A1 Dec. 8, 2005

(30) Foreign Application Priority Data

May 24, 2004 (JP) ................................. 2004-153741

(51) Int. Cl.
*H04N 5/92* (2006.01)
(52) U.S. Cl.
USPC .......................................................... 386/326
(58) Field of Classification Search
USPC .......................................................... 386/46
See application file for complete search history.

(56) References Cited

U.S. PATENT DOCUMENTS

2005/0196129 A1* 9/2005 Kobayashi ...................... 386/46

FOREIGN PATENT DOCUMENTS

| JP | 4-157522 | A | | 5/1992 | |
|----|----------|---|---|--------|---|
| JP | 63-090088 | A | | 4/1998 | |
| JP | 11-144030 | A | | 5/1999 | |
| JP | 11-185449 | A | | 7/1999 | |
| JP | 11-185449 | | * | 9/1999 | .................... 386/263 |
| JP | 11-317055 | A | | 11/1999 | |
| JP | 2000-83146 | A | | 3/2000 | |
| JP | 2001-084115 | A | | 3/2001 | |
| JP | 2001-169067 | A | | 6/2001 | |

* cited by examiner

*Primary Examiner* — William C Vaughn, Jr.
*Assistant Examiner* — Daniel Tekle
(74) *Attorney, Agent, or Firm* — Rossi, Kimms & McDowell LLP

(57) ABSTRACT

The image data recording apparatus includes an image data input device, a first write-in device, a second write-in device, and a controller for controlling write-in action to the first and second write-in devices, wherein the controller controls the second write-in device so that when the image data inputted by the image data input device is to be written into the first memory medium inserted into the first write-in device, the inputted image data may be precedingly written into the second memory medium, and controls the first write-in device so that during the ejection of the inserted first memory medium, the image data written into the second memory medium may be written into the first memory medium and also, the control information of the image data may be written into the first memory medium.

10 Claims, 9 Drawing Sheets

IMAGE DATA RECORDING APPARATUS, IMAGE DATA RECORDING METHOD, PROGRAM AND MEMORY MEDIUM

BACKGROUND OF THE INVENTION

1. Field of the Invention

This invention relates to an image data recording apparatus for recording inputted image data on a transportable memory medium, an image data recording method, a program and a memory medium.

2. Description of Related Art

As an image data recording apparatus for recording inputted image data on a write once type recordable transportable memory medium, e.g. a CD-R, there has heretofore been one in which use is made of a recording process of writing inputted image data into a hard disk drive, and writing this image data written into the hard disk drive further into a CD-R. For example, an invention described in Japanese Patent Application Laid-open No. H11-317055 discloses this recording process.

An image data recording apparatus using this recording process will hereinafter be described with reference to FIGS. 9 and 10 is a block diagram showing the construction of a conventional image data recording apparatus, and FIG. 10 is a flow chart showing the operational procedure of the image data recording apparatus, as shown in FIG. 9, is provided with an image input portion 101 for reading an image on an original supplied from a feeder portion (not shown), and inputting the image data thereof, a memory 103 comprising a RAM or the like for once holding the inputted image data therein a control program for controlling the entire apparatus, a CD-R drive (CD-R) 105 for storing therein the image data inputted to a CD-R medium, a display part 106 for displaying the operation mode, the inputted image data and error information or the like, an operation portion for inputting operation instruction such as operation setting instructions, and a controller 102 for controlling the entire apparatus in accordance with the above-mentioned control program.

The operation of this image data recording apparatus will now be described with reference to FIG. 10.

When the image data inputted by the image input portion 101 is to be recorded on the CD-R, the controller 102 first determines at a step S601 whether there is an original to be read in the feeder part of the image input portion 101. If there is an original in the above-mentioned feeder part, at a step S602, the controller 102 controls so as to read an original document supplied from the feeder part by the image input portion 101, and once store its image data into the memory 103 and thereafter write it into the hard disk drive (HD) 104. Then, the controller 102 returns to the step S601, where it determines where there is an original in the feeder part. If there is an original there, an original document supplied is likewise read, and its image data is written into the hard disk drive (HD) 104. In this manner, originals present in the feeder part are read one by one, and their image data are written into the hard disk drive (HD) 104.

If at the step S601, the absence of originals in the feeder part is determined, the controller 10 judges that all of the originals supplied from the feeder part have been read and their image data have been written into the hard disk drive (HD) 104, and at a step S603, it controls so as to read the image data out of the hard disk drive (HD) 104 and write the image data into the CD-R. Then, the controller 102 completes this processing.

In the conventional image data recording apparatus, however, each time the reading of a series of original images is completed, the recording of the image data thereof into the CD-R is effected and therefore, in the CD-R, the overhead of a control area consumed in each cycle of recording is integrated, and the use efficiency of the CD-R cannot be improved.

SUMMARY OF THE INVENTION

A purpose of the present invention is to provide an image data recording apparatus, an image data recording method, a program and a recording medium which can improve the use efficiency of a first memory medium comprising a recordable transportable memory medium.

Another purpose of the present invention is to provide an image data recording apparatus having an image data input device for inputting image data, a first write-in device for writing the image data inputted by the image data input device into a first memory medium comprising a transportable memory medium, a second write-in device for writing the image data inputted by the image data input device into a second memory medium, and a controller for controlling write-in action to the first and second write-in devices, characterized in that the controller controls the second write-in device so that when the image data inputted by the image data input device is to be written into the first memory medium inserted into the first write-in device, the inputted image data may be precedently written into the second memory medium, and controls the first write-in device so that during the ejection of the inserted first memory medium, the image data written into the second memory medium may be written into the first memory medium and also, the control information of the image data may be written into the first memory medium.

A further purpose of the present invention is to provide an image data recording method in an image data recording apparatus provided with an image data input device for inputting image data, a first write-in device for readably writing the image data inputted by the image data input device into a first memory medium comprising a recordable transportable memory medium, and a second write-in device for readably writing the image data inputted by the image data input device into a second memory medium, characterized by the step of controlling the second write-in device so that when the image data inputted by the image data input device is to be written into the first memory medium inserted into the first write-in device, the inputted image data may be precedently write into the second memory medium, and the step of controlling the first write-in device so that during the ejection of the inserted first memory medium, the image data written into the second memory medium may be written into the first memory medium and also, the control information of the image data may be written into the first memory medium.

A further purpose of the present invention is to provide a program to be executed on an image data recording apparatus provided with an image data input device for inputting image data, a first write-in device for readably writing the image data inputted by the image data input device into a first memory medium comprising a recordable transportable memory medium, and a second write-in device for readably writing the image data inputted by the image data input device into a second memory medium, characterized by a first control module for controlling the second write-in device so that when the image data inputted by the image data input device is to be written into the first memory medium inserted into the first write-in device, the inputted image data may be precedently written into the second memory medium, and a second control module for controlling the first write-in device so that during the ejection of the inserted first memory medium, the image data written into the second memory medium may be written into the first memory medium and also, the control information of the image data may be written into the first memory medium.

A still further purpose of the present invention is to provide a memory medium characterized in that the above-described program is stored therein readably by a computer.

Other objects and features of the present invention will become apparent from the following description and the accompanying drawings.

DETAILED DESCRIPTION OF THE PREFERRED EMBODIMENTS

Some embodiments of the present invention will hereinafter be described with reference to the drawings.

Figure 1:
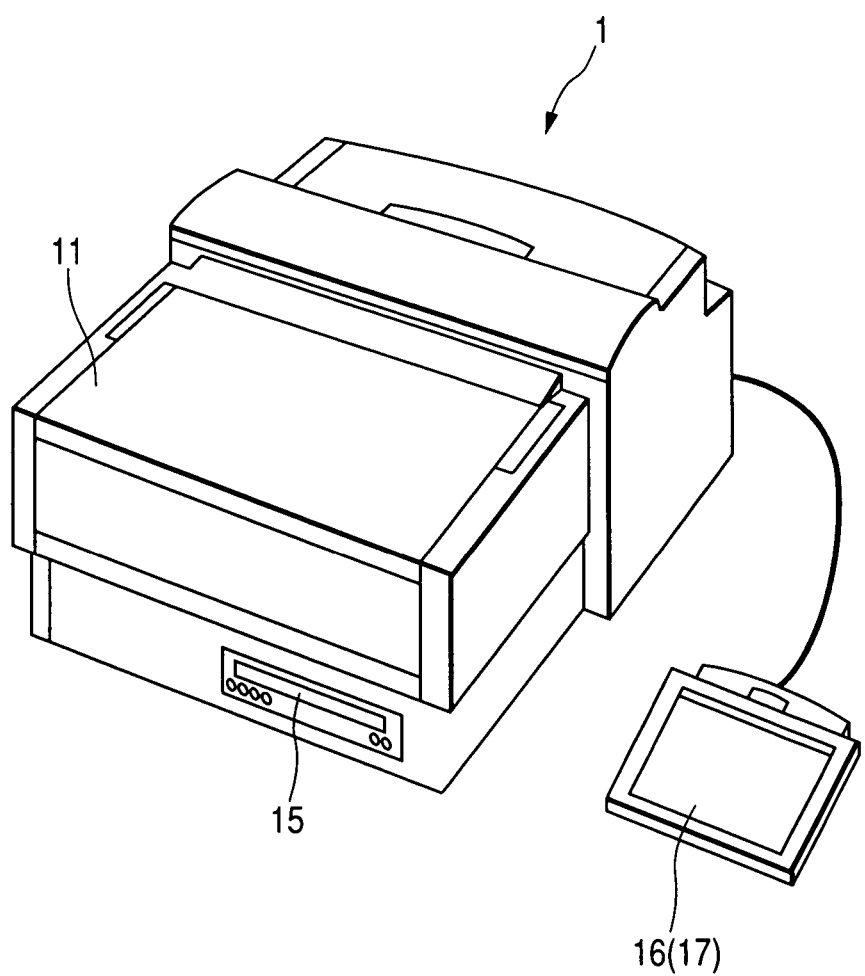
FIG. 1 is a pictorial view of an image data recording apparatus according to an embodiment of the present invention.
Figure 2:
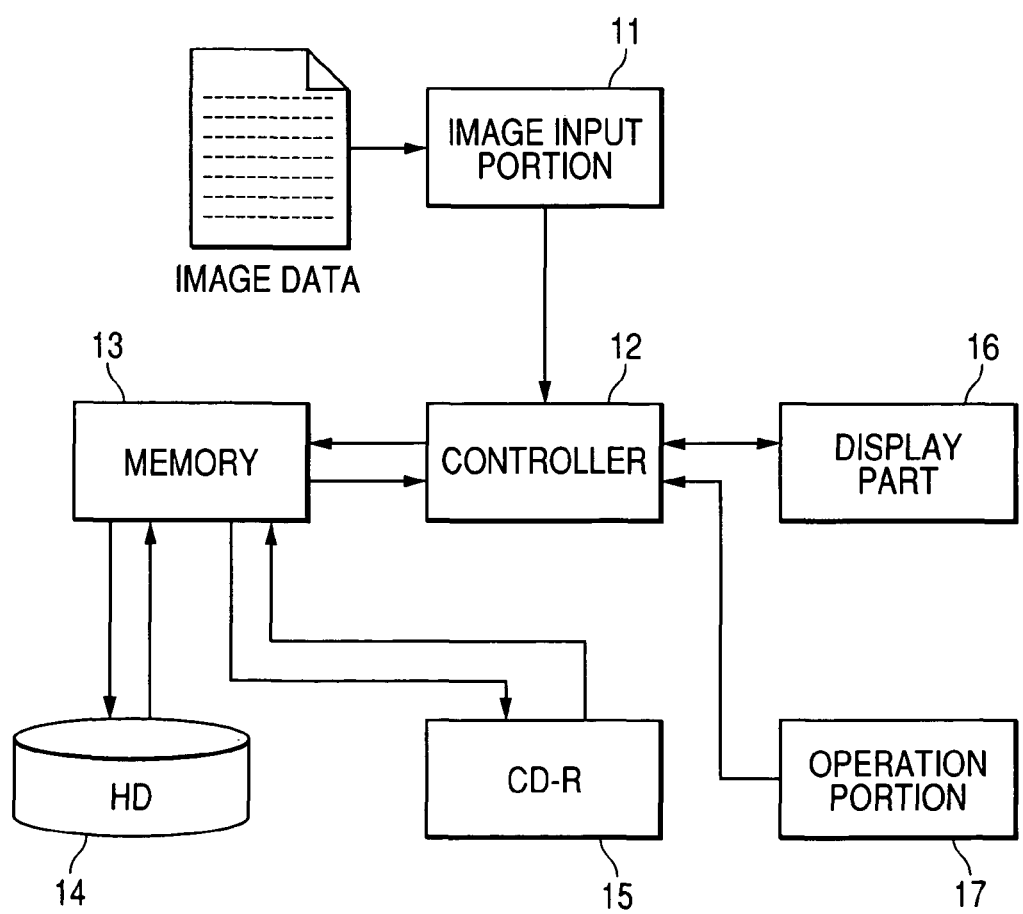
FIG. 2 is a block diagram showing the internal construction of the image data recording apparatus of FIG. 1.
Figure 3:
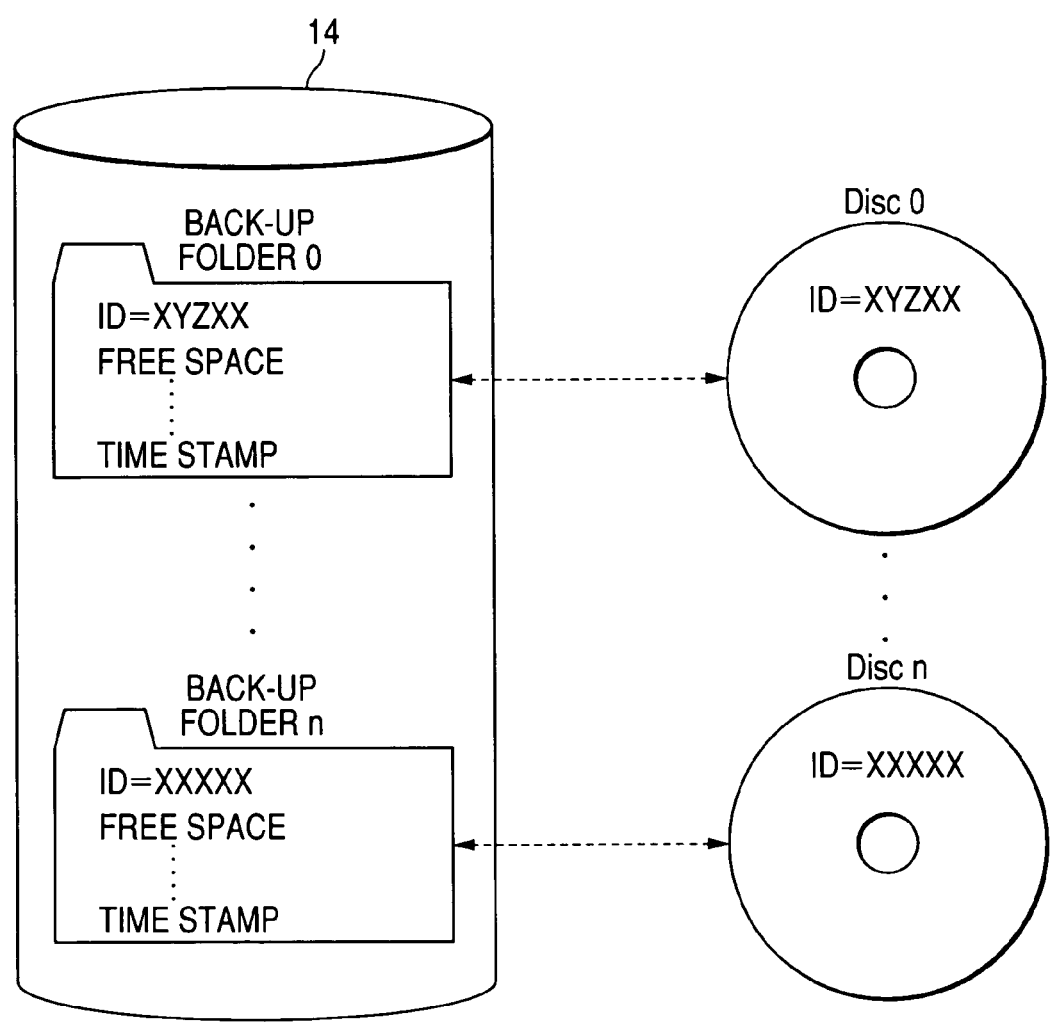
FIG. 3 typically shows the housing structure of a back-up folder for the data of a CD-R in a hard disk drive (HD) 14 in FIG. 2.

FIG. 1 is a pictorial view of an image data recording apparatus according to an embodiment of the present invention, FIG. 2 is a block diagram showing the internal construction of the image data recording apparatus of FIG. 1, and FIG. 3 typically shows the storing structure of a back-up folder for the data of a CD-R in a hard disk drive (HD) 14 in FIG. 2.

The image data recording apparatus 1, as shown in FIG. 2, is provided with an image input portion 11 provided with a feeder part (not shown) for supplying an original to be read and for reading an image on the original supplied from the feeder part, and inputting the image data thereof, a memory 13 comprising a RAM or the like for once holding the image data inputted from the image input portion 11, a hard disk drive (HD) 14 for storing the inputted image data therein and also storing therein a control program for controlling the entire apparatus, a CD-R drive (CD-R) 15 for effecting the writing of the inputted image data into a CD-R which is a transportable memory medium and the read-out of the data from the CD-R, a display part 16 for displaying the inputted image data and error information or the like, an operation portion 17 for inputting operational instructions such as operation setting instructions, and a controller for controlling the entire apparatus in accordance with the above-described program. The control program 12 is comprised of a CPU, a ROM and a RAM or the like.

In the image data recording apparatus 1, as shown in FIG. 1, the image input portion 11 is provided on the upper surface of an apparatus main body, and the CD-R drive 15 is provided on a side of the apparatus main body. Also, the display part 16 is connected to the apparatus main body (controller 12) through a cable. The display part 16 comprises a liquid crystal panel having a touch panel attached thereto, and the operation portion 17 is constituted by the touch panel.

In this image data recording apparatus 1, as shown in FIG. 3, back-up folders m (m=0-n) corresponding to respective CD-Rm (m=0-n) are housed in the hard disk drive 14 so as to back-up-control the image data of a plurality of CD-Rs (disks). Back-up data to the data of the corresponding CD-R is written in each back-up folder m, and ID (identification information) for primarily identifying the corresponding CD-R, the remaining capacity data of the CD-R and the time stamp of the data lastly written into the CD-R are also held therein.

The control program stored in the hard disk drive 14 includes disk insertion detecting processing for detecting the insertion of the CD-R into the CD-R drive 15, record processing of precedently writing the inputted image data into the corresponding back-up folder in the hard disk drive 14 when the inputted image data is to be written into the CD-R, and disk ejecting processing of reading out the image data written into the corresponding back-up folder in the hard disk drive 14 during the ejection of the CD-R, and writing the image data into the CD-R by the CD-R drive 15, and these series of processings are executed by the controller 12 executing the above-described control program. The details of these series of processings will be described later.

Figure 4:
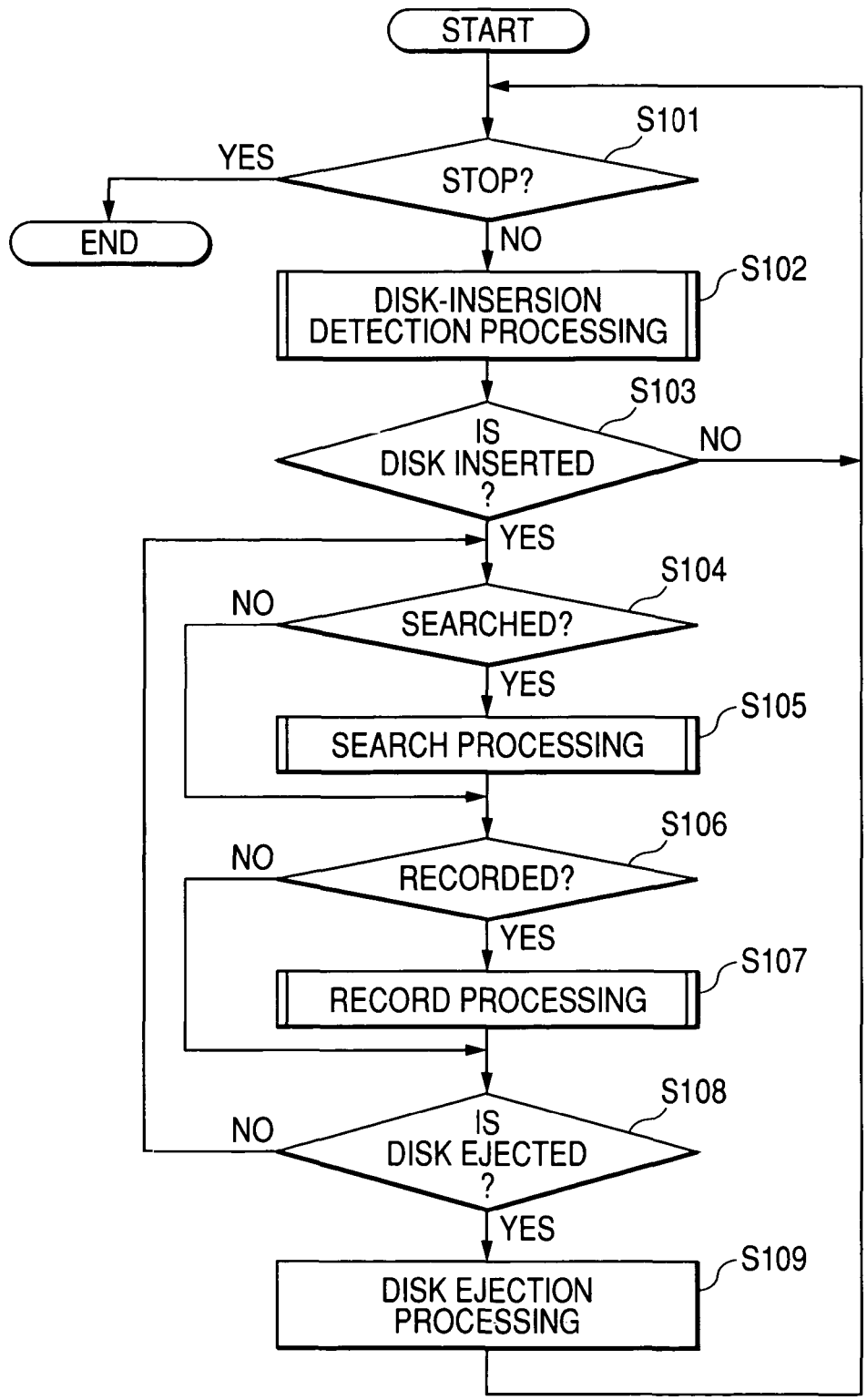
FIG. 4 is a flow chart showing the operational procedure of the image data recording apparatus of FIG. 1.

The operation of this image data recording apparatus 1 will now be described with reference to FIG. 4. FIG. 4 is a flow chart showing the operational procedure of the image data recording apparatus of FIG. 1. The operational procedure shown in this FIG. 4 is executed by the controller 12 executing the above-described program.

The controller 12, as shown in FIG. 4, first determines at a step S101 whether the operation should be stopped by a user's operation through the operation portion 17. If here, the operation should not be stopped, at a step S102, the controller 12 executes disk insertion detection processing for detecting whether the CD-R has been inserted into the CD-R drive 15. The details of this disk insertion detection processing will be described later. Then, at a step S103, the controller 12 determines on the basis of the result of the above-described disk insertion detection processing (the value of a flag for showing the result of the detection of the disk insertion) whether the CD-R is inserted. If the CD-R is not inserted, the controller 12 returns to the step S101. In contrast, if the CD-R is inserted, at a step S104, the controller 12 determines whether search has been selected by the user's operation through the operation portion 17. If here, search is selected, at a step S105, the controller 12 executes the search processing of a back-up folder corresponding to the inserted CD-R in the hard disk drive (HD) 14. The details of this search processing will be described later. Then, the controller 12 proceeds to a step S106. If at the step 104, search is not selected, the controller 12 skips the step S105 and proceeds to a step S106.

At the step S106, the controller 12 determines whether recording has been selected by the user's operation through the operation portion 17. If here, recording has been selected, at a step S107, the controller 12 executes record processing for inputting image data from the image input portion 11 and writing the image data into a corresponding folder in the hard disk drive (HD) 14. The details of this record processing will be described later. If record is not selected, the controller 12 skips the step S107 and proceeds to a step 810.

At the step S108, the controller 12 determines whether the ejection of the CD-R has been selected by the user's operation through the operation portion 17. If here, the ejection of the CD-R is not selected, the controller 12 returns to the step S104. In contrast, if the ejection of the CD-R has been selected, at a step S109, the controller 12 executes disk ejection processing including the processing of reading out the image data written into the corresponding back-up folder in the hard disk drive 14 and writing the image data into the CD-R. The details of this disk ejection processing will be described later. Then, the controller 12 returns to the step S101.

Figure 5:
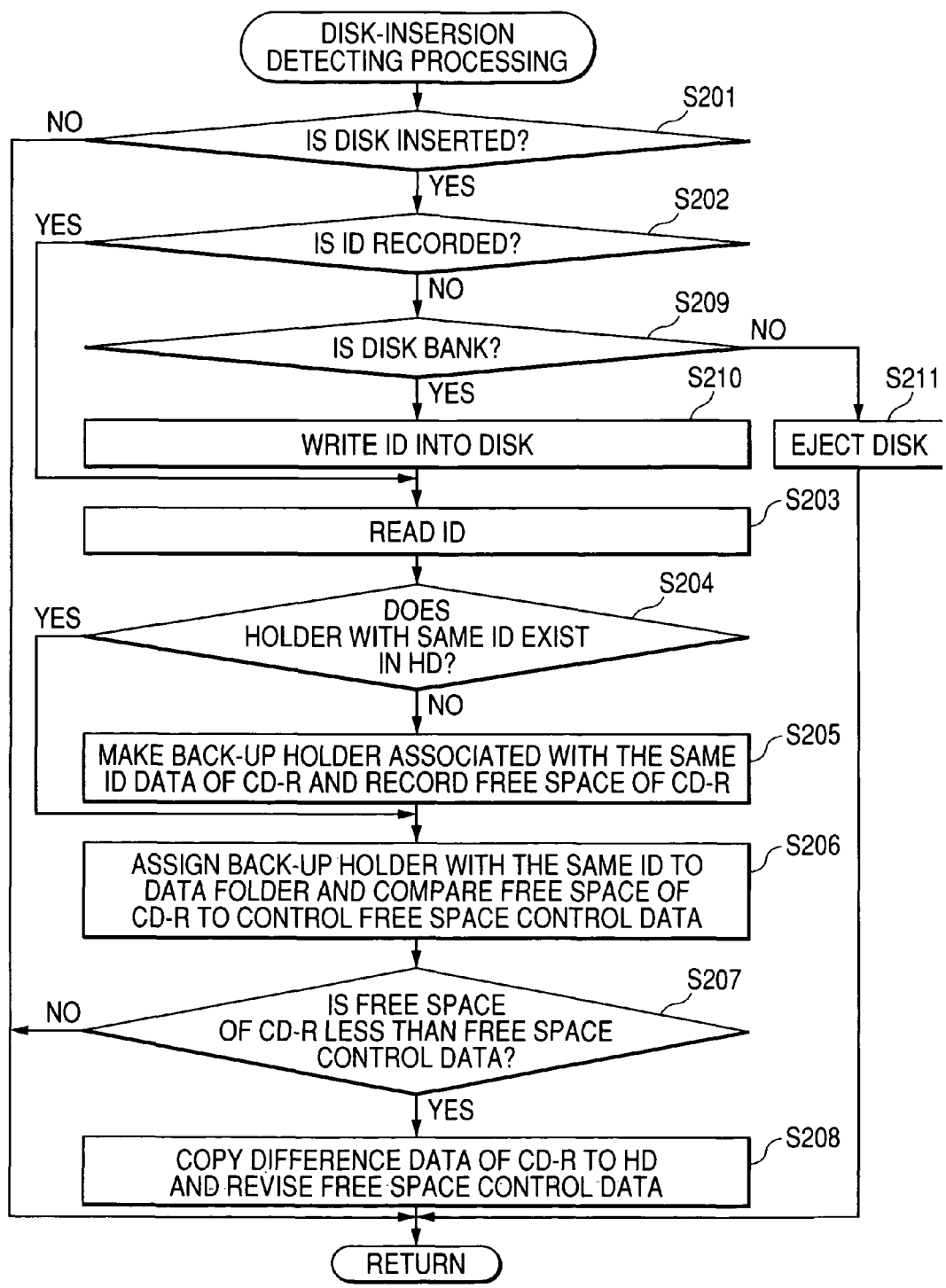
FIG. 5 is a flow chart showing the procedure of the disk insertion detecting processing of the step S102 of FIG. 4.

The disk insertion detection processing of the step S102 will now be described with reference to FIG. 5. FIG. 5 is a flow chart showing the procedure of the disk insertion detection processing of the step S102 of FIG. 4.

When the disk insertion detection processing is started, as shown in FIG. 5, first at a step S201, the controller 12 determines on the basis of the output of the disk detecting sensor of the CD-R drive 15 whether the CD-R has been inserted. If here, the CD-R is not inserted, the controller 12 rewrites the value of a flag for showing the result of the detection of disk insertion into a value indicative of the absence of the disk insertion, and leaves this processing. In contrast, if the CD-R is inserted, at a step S202, the controller 12 determines whether ID (identification information) for primarily identifying the CD is recorded on the inserted CD-R. If here, the ID is not recorded on the CD-R, at a step S209, the controller 12 determines whether the CD-R is a blank medium, and if the CD-R is not a blank medium, at a step S211, the controller 12 controls so as to forcibly eject the CD-R from the CD-R drive 15, and rewrites the value of the flag for showing the result of the detection of the disk insertion into a value indicative of the absence of the disk insertion. Then, the controller 12 leaves this processing.

If at the step S209, it is determined that the CD-R is a blank medium, at a step S210, the controller 12 produces ID for primarily identifying the CD-R, and controls the CD-R drive 15 so as to write the produced ID into the CD-R.

If at the step S202, it is determined that the ID is recorded on the CD-R, or after the writing-in of the ID at the step S210, at a step S203, the controller 12 controls the CD-R drive 15 so as to read the ID of the CD-R, and at the next step S204, the controller 12 determines whether a back-up folder holding ID coinciding with the ID of the CD-R is present in the hard disk drive (HD) 14. If here, there is not present the back-up folder holding the ID coinciding with the ID of the CD-R, at a step S205, the controller 12 prepares a back-up folder made to correspond to the ID of the CD-R in the hard disk drive (HD) 14. At this time, the data of the CD-R is copied into the back-up folder prepared in the hard disk drive (HD) 14 and also, the remaining capacity value of the CD-R is recorded on the above-described back-up folder as remaining capacity value control data. Also, the time stamp of the data lastly written into the CD-R is recorded on the above-described back-up folder.

If at the step S204, it is determined that there is present a back-up folder holding ID coinciding with the ID of the CD-R, or after the preparation of the folder at the step S205, at a step S206, the controller 12 assigns the back-up folder with the same ID as the ID of the CD-R to a data folder, and compares the actual remaining capacity value EVt of the inserted CD-R to remaining capacity control data EVb indicative of the remaining capacity value of the CD-R held by the back-up folder.

Then, at a step S207, the controller 12 determines on the basis of the result of the comparison at the step S206 whether the relation that the remaining capacity value EVt of the CD-R is less than the remaining capacity control data EVb materializes. If here, the relation that the remaining capacity value EVt of the CD-R is less than the remaining capacity control data EVb materializes, the inserted CD-R is thought to be one on which before the recording by the present image data recording apparatus 1, image data has been recorded by other image data recording apparatus. In this case, at a step S208, the controller 12 copies data corresponding to the difference between the remaining capacity value EVt of the CD-R and the remaining capacity control data EVb (e.g. image data recorded by other image data recording apparatus) into a corresponding back-up folder in the hard disk drive (HD) 14 (a back-up folder with the same ID as the ID of the CD-R), and renews the value of the remaining capacity control data EVb in this back-up folder into the value of the actual remaining capacity value EVt. Then, the controller 12 leaves this processing.

In contrast, if at the step S207, the relation that the remaining capacity value EVt of the CD-R is less than the remaining capacity control data EVb does not materialize, the controller 12 skips the step S208 and leaves this processing.

Figure 6:
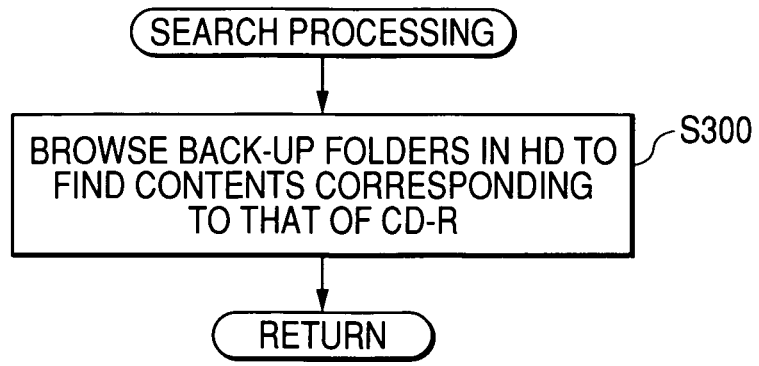
FIG. 6 is a flow chart showing the procedure of the search processing of the step S105 of FIG. 4.

The search processing of the step S105 of FIG. 4 will now be described with reference to FIG. 6. FIG. 6 is a flow chart showing the procedure of the search processing of the step S105 of FIG. 4.

When the search processing is started, at a step S300, the controller 12, as shown in FIG. 6, searches the interior of the back-up folder with the seame ID as the ID of the CD-R in the hard disk drive (HD) 14, and effects image display or the like. Then, the controller 12 leaves this processing.

Figure 7:
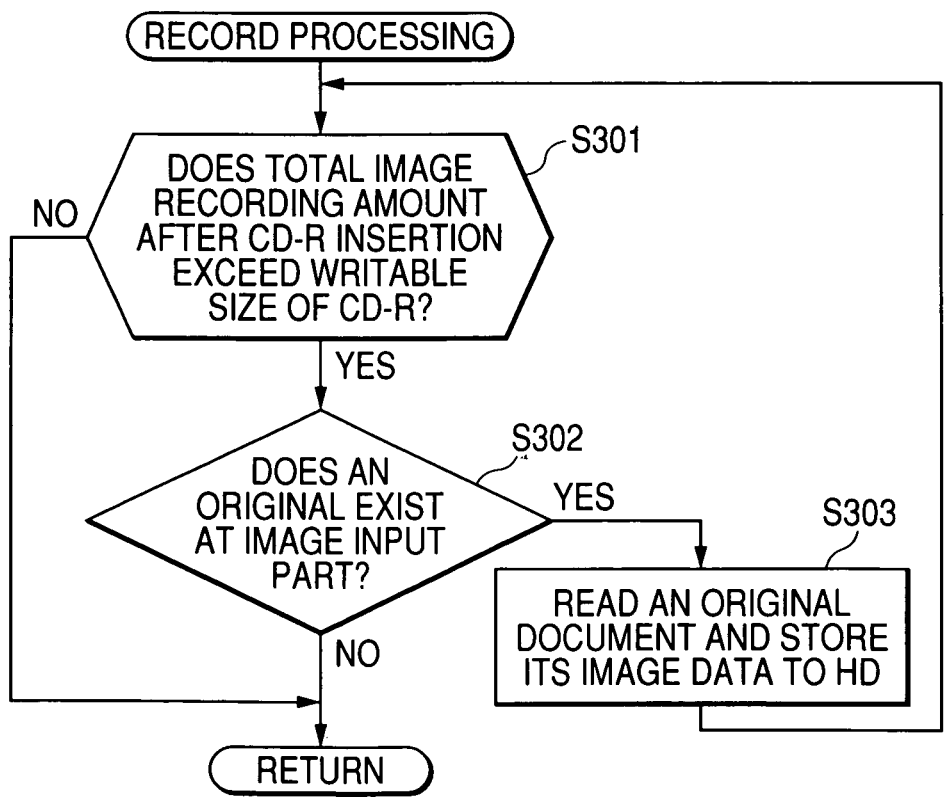
FIG. 7 is a flow chart showing the procedure of the record processing of the step S107 of FIG. 4.

The record processing of the step S107 of FIG. 4 will now be described with reference to FIG. 7. FIG. 7 is a flow chart showing the procedure of the record processing of the step S107 of FIG. 4.

When the record processing is started, first at a step S301, the controller 12, as shown in FIG. 7, determines whether the total image recording amount newly written into the inserted CD-R exceeds the writable size of the CD-R. Here, the writable size of the CD-R is (the remaining capacity value EVt of the CD-R)—(control size consumed in one cycle of writing processing into the CD-R)—(margin). Also, the initial value of the above-mentioned total image recording amount is set to "0", and in the first determination, it is determined that the total image recording amount does not exceed the writable size of the CD-R.

If it is determined that the total image recording amount does not exceed the writable size of the CD-R, at a step S302, the controller 12 determines whether in the feeder part of the image input portion 11, there exists an original to be read. If here, there exists an original in the feeder part, at a step S303, the controller 12 reads an original document supplied from the feeder part by the image input portion 11, and controls so as to once store the image data thereof in the memory 13, and thereafter write the image data into a back-up folder with the same ID as the ID of the CD-R in the hard disk drive (HD) 14. At this time, the recording amount of the read image data is added to the total image recording amount. Then, the controller 12 returns to the step S301, where it determines whether the above-mentioned total image recording amount exceeds the writable size of the CD-R. If the above-mentioned total image recording amount does not exceed the writable size of the CD-R and there exists the next original document in the feeder part, the controller 12 controls so that an original document supplied may likewise be read, and the image data thereof may be written into into a back-up folder with the same ID as the ID of the CD-R in the hard disk drive (HD) 14.

Then, the recording amount of the read image data is added to the total image recording amount. If in this manner, the above-mentioned total image recording amount does not exceed the writable size of the CD-R, original documents present in the feeder part are read one by one and the image data thereof are written into the hard disk drive (HD) 14.

If at the step S302, it is determined there exists no original document, the controller 12 judges that all of original documents supplied from the feeder part have been read and the image data thereof have been written into the hard disk drive (HD) 14, and leaves this processing.

If before the reading of all of the original documents is completed, at the step S301, it is determined that the above-mentioned total image recording amount has exceeded the writable size of the CD-R, the controller 12 judges that image data of all the original documents to be read cannot be recorded on the CD-R, and leaves this processing.

Figure 8:
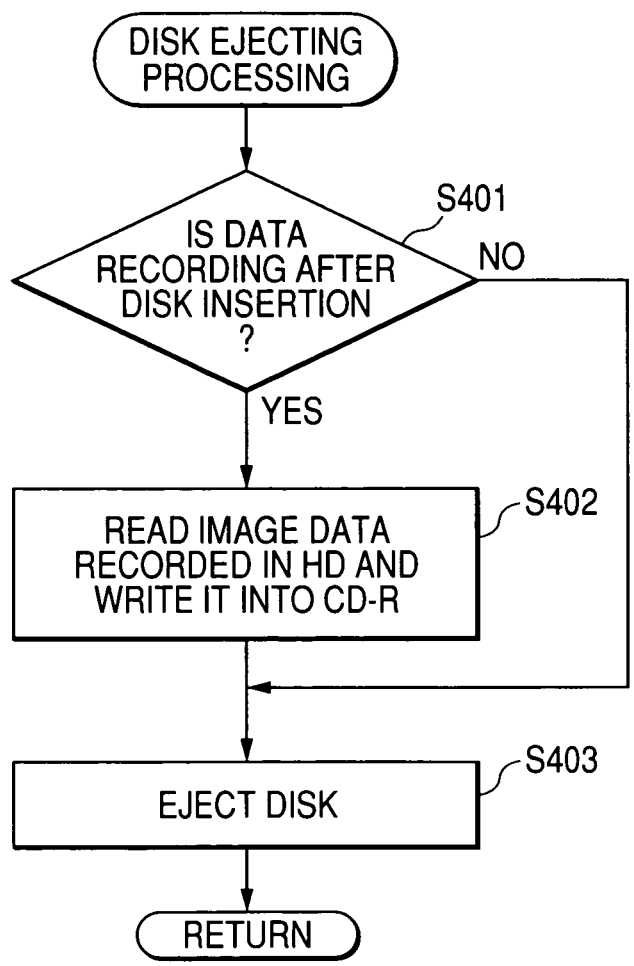
FIG. 8 is a flow chart showing the procedure of the disk ejecting processing of the step S109 of FIG. 4.
Figure 9:
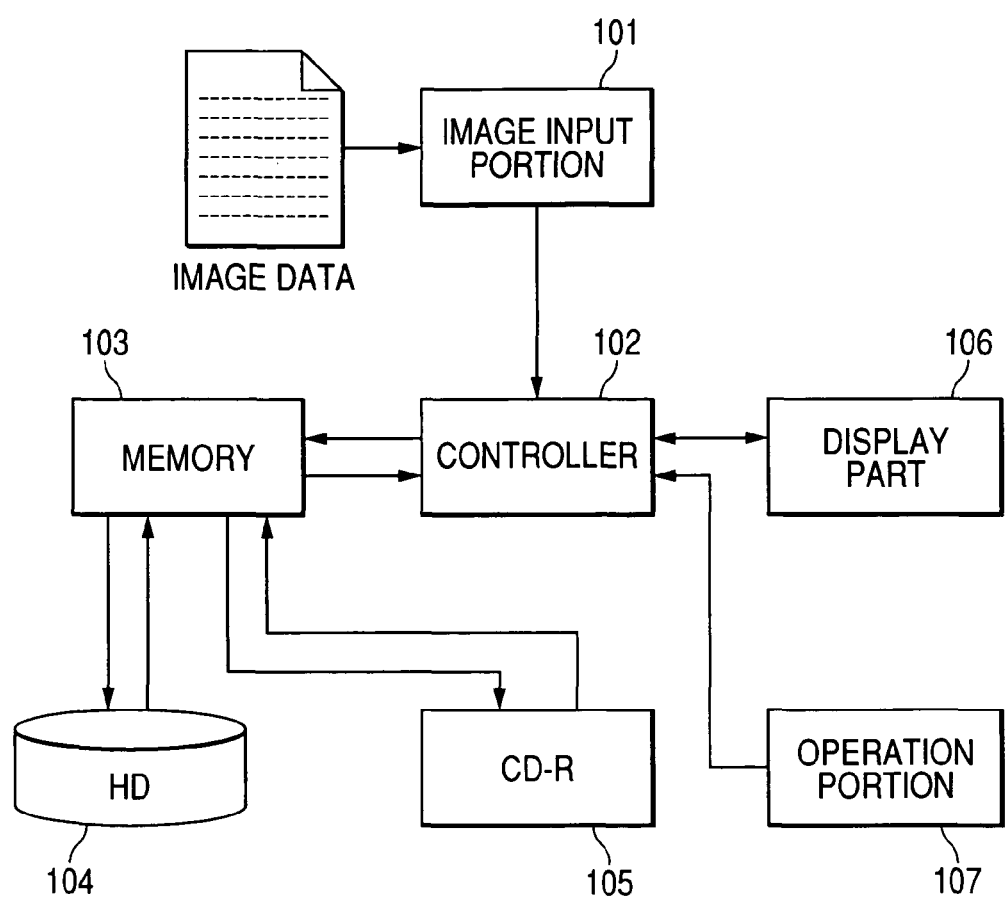
FIG. 9 is a block diagram showing the construction of a conventional image data recording apparatus.
Figure 10:
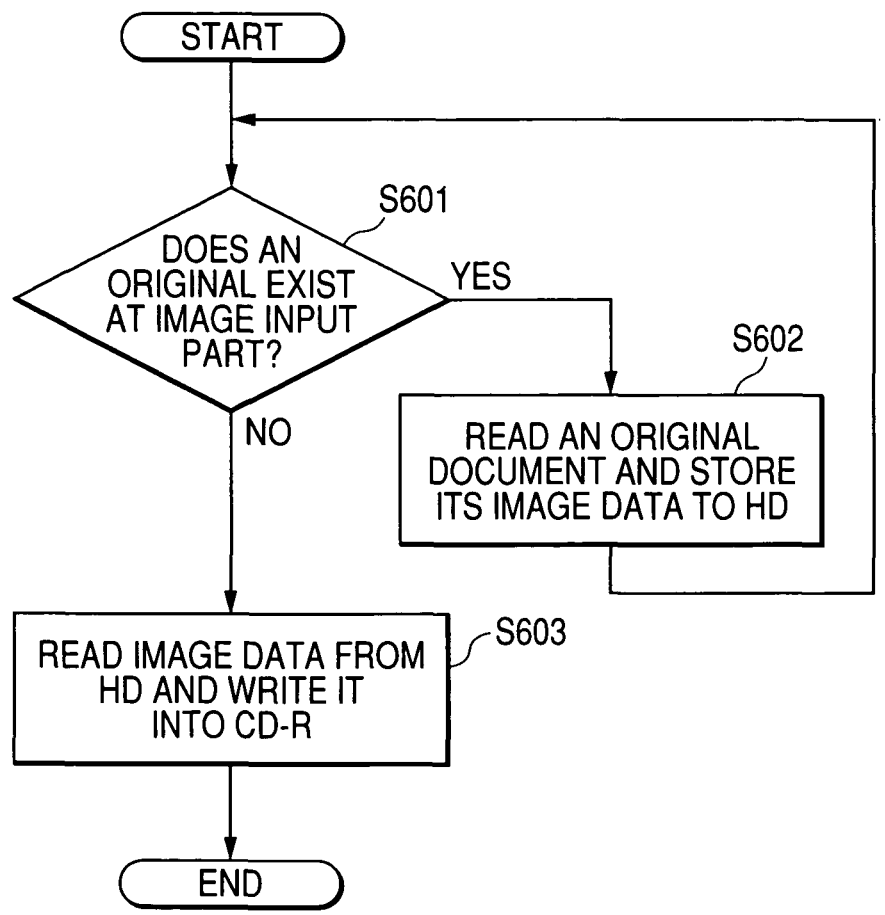
FIG. 10 is a flow chart showing the operational procedure of the image data recording apparatus of FIG. 9.

The disk ejection processing of the step S109 of FIG. 4 will now be described with reference to FIG. 8. FIG. 8 is a flow chart showing the procedure of the disk ejection processing of the step S109 of FIG. 4.

When the disk ejection processing is started, first at a step S401, the controller 12, as shown in FIG. 8, determines whether the record processing (step S107) after the insertion of the CD-R has been executed. If here, the record processing (step S107) after the insertion of the CD-R is executed, at a step S402, the controller 12 controls the CD-R drive 15 so as to write the image data newly written into the corresponding back-up folder in the hard disk drive (HD) 14 (the image data recorded by the record processing of the step S107) into the CD-R. At this time, the control data of the written-in image data is written into the CD-R. Also, the value of the remaining capacity control data EVb held in the corresponding back-up folder in the hard disk drive (HD) is renewed into the value of the remaining capacity value EVt of the CD-R after the writing-in of the above-mentioned image data. Then, at a step S403, the controller 12 controls so that the CD-R may be ejected from the CD-R drive 15, and leaves this processing.

If at the step S401, it is determined that the record processing (step S107) after the insertion of the CD-R is not executed, at the step S403, the controller 12 controls so that the CD-R may be ejected from the CD-R drive 15, and leaves this processing.

As described above, in the present embodiment, the inputted image data is precedently written into the hard disk drive 14, and during the ejection of the CD-R, the image data is read out of the hard disk drive 14 and is written into the CD-R and therefore, the overhead of the control data occurring during the writing into the CD-R is decreased. As a result, the use efficiency of the CD-R can be improved.

In the present embodiment, description has been made with the CD-R as an example of the recordable transportable memory medium, but even in the case of other transportable memory medium, a similar effect can be expected for a medium in which the overhead of control data occurs during the writing-in of data.

Also, while in the present embodiment, design is made such that during the insertion of the CD-R, the remaining capacity value of the CD-R is compared to the remaining capacity control data held in the corresponding back-up folder in the hard disk drive 14 to thereby judge the identity of the data with the CD-R and the corresponding back-up folder, design may be made such that a time stamp is written in after the writing of data into the CD-R and this time stamp is held in a corresponding back-up folder in the hard disk drive 14, and during the insertion of the CD-R, the time stamp of the CD-R is compared to the time stamp of the corresponding back-up folder to thereby judge the identity of the data with the CD-R and the corresponding back-up folder.

The object of the present invention can of course be also achieved by supplying a system or an apparatus with a memory medium (or a recording medium) having recorded therein a program code of software realizing the function of the aforedescribed embodiment, and the computer (or the CPU or MPU) of the system or the apparatus reading out and executing the program code stored in the memory medium. In this case, the program code itself read out of the memory medium realizes the function of the aforedescribed embodiment and thus, the memory medium storing the program code therein constitutes the present invention.

Also, as the memory medium for supplying the program code, use can be made, for example, of a Floppy (registered trademark) disk, a hard disk, a magneto-optical disk, a CD-ROM, a CD-R, a CD-RW, a DVD-ROM, a DVD-Ram, a DVD-RW, DVD+RW, a magnetic tape, a non-volatile memory card, a ROM or the like. Or the program code may be downloaded through a network.

Also, not only the function of the aforedescribed embodiment is realized by the computer executing the read-out program code, but also there is covered a case where an operating system (OS) or the like working on the computer executes part or the whole of actual processing and the function of the aforedescribed embodiment is realized by that processing.

Further, there is also covered a case where the program code read out of the memory medium is written into a memory provided in a function enlarging card inserted in the computer or a function enlarging unit connected to the computer, whereafter on the basis of the instructions of the program code, a CPU or the like provided in the function enlarging card or the function enlarging unit executes part or the whole of actual processing, and the function of the aforedescribed embodiment is realized by that processing.

As described above, according to the present embodiment, the use efficiency of a first memory medium (CD-R) comprising a recordable transportable memory medium can be improved.

This application claims priority from Japanese Patent Application No. 2004-153741 filed May 24, 2004, which is hereby incorporated by reference herein.

What is claimed is:

1. An image data recording apparatus comprising:
an image data input device which inputs image data;
an instruction input device which inputs an operational instruction for the image data recording apparatus;
a first write-in device which writes the image into a first memory medium comprising a write-once-type transportable memory medium;
a second write-in device which writes the image data inputted by said image data input device into a second memory medium; and
a controller which controls write-in action of said first and second write-in devices;
wherein said controller controls said first write-in device so that said first write-in device writes a series of plural image data stored in said second memory medium into said first memory medium and also writes integrated control information of said plural image data into said first memory medium in accordance with the operational instruction, and
wherein said controller controls said first write-in device so that said first write-in device writes a series of plural image data stored in said second memory medium into said first memory medium and also writes control information of said image data into said first memory medium in accordance with the operational instruction, and wherein after completion of writing operation of the series of plural image data and the control information into said first memory medium, the first write-in device ejects said inserted first memory medium.

2. An image data recording apparatus according to claim 1, wherein said second memory medium at least holds a folder made to correspond to identification information for identifying said first memory medium, and into said folder corresponding to said first memory medium identified by said identification information said second write-in device can at least write the image data, and said controller, when the first memory medium has been inserted into said first write-in device, determines whether a folder with corresponding identification information to the identification information written into said inserted first memory medium is held on said second memory medium, and if it is determined that the folder with corresponding identification information to the identification information written into said inserted first memory medium is held on said second memory medium, said controller controls said second write-in device so as to write the image data inputted by said image input device into the folder with corresponding identification information to said identification information.

3. An image data recording apparatus according to claim 2, wherein the duplicate data of the image data already written into said inserted first memory medium is held on the folder corresponding to the first memory medium identified by said identification information, said controller, when it is determined that the folder with corresponding identification information to the identification information written into said inserted first memory medium is held on said second memory medium, determines whether image data different from the duplicate data written into the folder with corresponding identification information as said identification information, is included in the image data already written into said inserted first memory medium, and said controller, if it is determined that the image data different from said duplicate data is included in the image data already written into said inserted first memory medium, controls said second write-in device so as to copy the image data different from said duplicate data which is included in the image data in said inserted first memory medium into the folder with corresponding identification information to said identification information.

4. An image data recording apparatus according to claim 3, wherein remaining capacity value of the first memory medium identified by said identification information is written into the folder corresponding to the first memory medium identified by said identification information, said controller determines whether the image data different from the duplicate data written into the folder with corresponding identification information to said identification information is included in the image data already written into said inserted first memory medium, by determining whether the remaining capacity value of said inserted first memory medium is smaller than the remaining capacity value of the first memory medium written into the folder with corresponding identification information to said identification information, and said controller, if it is determined that the remaining capacity value of said inserted first memory medium is smaller than the remaining capacity value of the first memory medium written into the folder with corresponding identification information to said identification information, controls said second write-in device so as to copy the data corresponding to a difference between said remaining capacity values into the folder with corresponding identification information to said identification information, as image data different from said duplicate data included in the image data of said inserted first memory medium, and also to renew the remaining capacity value of the first memory medium written into the folder with corresponding identification information to said identification information into the remaining capacity value of said first memory medium.

5. An image data recording apparatus according to claim 4, wherein said controller writes the image data inputted by said image input device into the folder with corresponding identification information to said identification information, and there after renews the remaining capacity value written into the folder with corresponding identification information to said identification information into a remaining capacity value when said inputted image data has been written into said inserted first memory medium.

6. An image data recording apparatus according to claim 3, wherein a time stamp for the last data in the first memory medium identified by said identification information is written into the folder corresponding to the first memory medium identified by said identification information, said controller determines whether the image data different from the duplicate data written into the folder with corresponding identification information to said identification information is included in the image data already written into said inserted first memory medium, by determining whether the time stamp for the last data in said inserted first memory medium is the same as a time stamp written into the folder with corresponding identification information to said identification information, and said controller, if the time stamp of said inserted first memory medium differs from the time stamp written into said second memory medium, controls said second write-in device so as to copy the data having the time stamp newer than that written into the folder with corresponding identification information to said identification information in said inserted first memory medium into the folder with corresponding identification information to said identification information, as image data different from said duplicate data included in the image data in said inserted first memory medium, and also renew the time stamp of the folder with corresponding identification information to said identification information into a time stamp written into said first memory medium.

7. An image data recording apparatus according to claim 6, wherein said controller writes the image data inputted by said image input device into the folder with corresponding identification information to said identification information, and thereafter renews the time stamp written into the folder with corresponding identification information to said identification information into a time stamp when said inputted image data has been written into said inserted first memory medium.

8. An image data recording apparatus according to claim 2, wherein if identification information is not written into said inserted first memory medium, said controller produces identification information for identifying said inserted first memory medium and a folder made to correspond to said identification information, and said controller controls said first write-in device so as to write said produced identification information into said inserted first memory medium and also, controls said second write-in device so as to write said produced folder into said second memory medium, and determines, after the writing-in of said produced identification information and said produced folder, whether the folder with corresponding identification information to the identification information written into said inserted first memory medium is held on said second memory medium.

9. An image data recording method for an image data recording apparatus provided with an image data input device for inputting image data, an instruction input device which inputs a operational instruction for the image data recording apparatus, a first write-in device for readably writing the image data inputted by said image data input device into a first memory medium comprising a write-once-type recordable transportable memory medium, and a second write-in device for readably writing the image data into a second memory medium, comprising:
- the step of controlling said second write-in device so that when the image data is inputted by said image data input device, said second write-in device precedingly writes said inputted image data into said second memory medium in accordance with the operational instruction; and
- the step of controlling said first write-in device so that said first write-in device writes a series of plural image data stored in said second memory medium into said first memory medium and also writes integrated control information of said plural image data into said first memory medium in accordance with the operational instruction, and
- so that after completion of writing operation of the series of plural image data and the control information into said first memory medium, the first write-in device ejects said inserted first memory medium.

10. A non-transitory computer-readable storage medium storing therein a program to be executed on an image data recording apparatus provided with an image data input device for inputting image data, an instruction input device which inputs an operational instruction for the image data recording apparatus, a first write-in device for readably writing the image data into a first memory medium comprising a write-once-type recordable transportable memory medium, and a second write-in device for readably writing the image data inputted by said image data input device into a second memory medium, the program comprising:
- a first control module for controlling said second write-in device so that when the image data is inputted by said image data input device, said second write-in device precedingly writes said inputted image data into said second memory medium in accordance with the operational instruction; and
- a second control module for controlling said first write-in device so that said first write-in device writes a series of plural image data stored in said second memory medium into said first memory medium and said first write-in device also writes integrated control information of said plural image data into said first memory medium in accordance with the operational instruction,
- and so that after completion of writing operation of the series of plural image data and the control information into said first memory medium, said first write-in device ejects said inserted first memory medium.

* * * * *